Patented Oct. 8, 1940

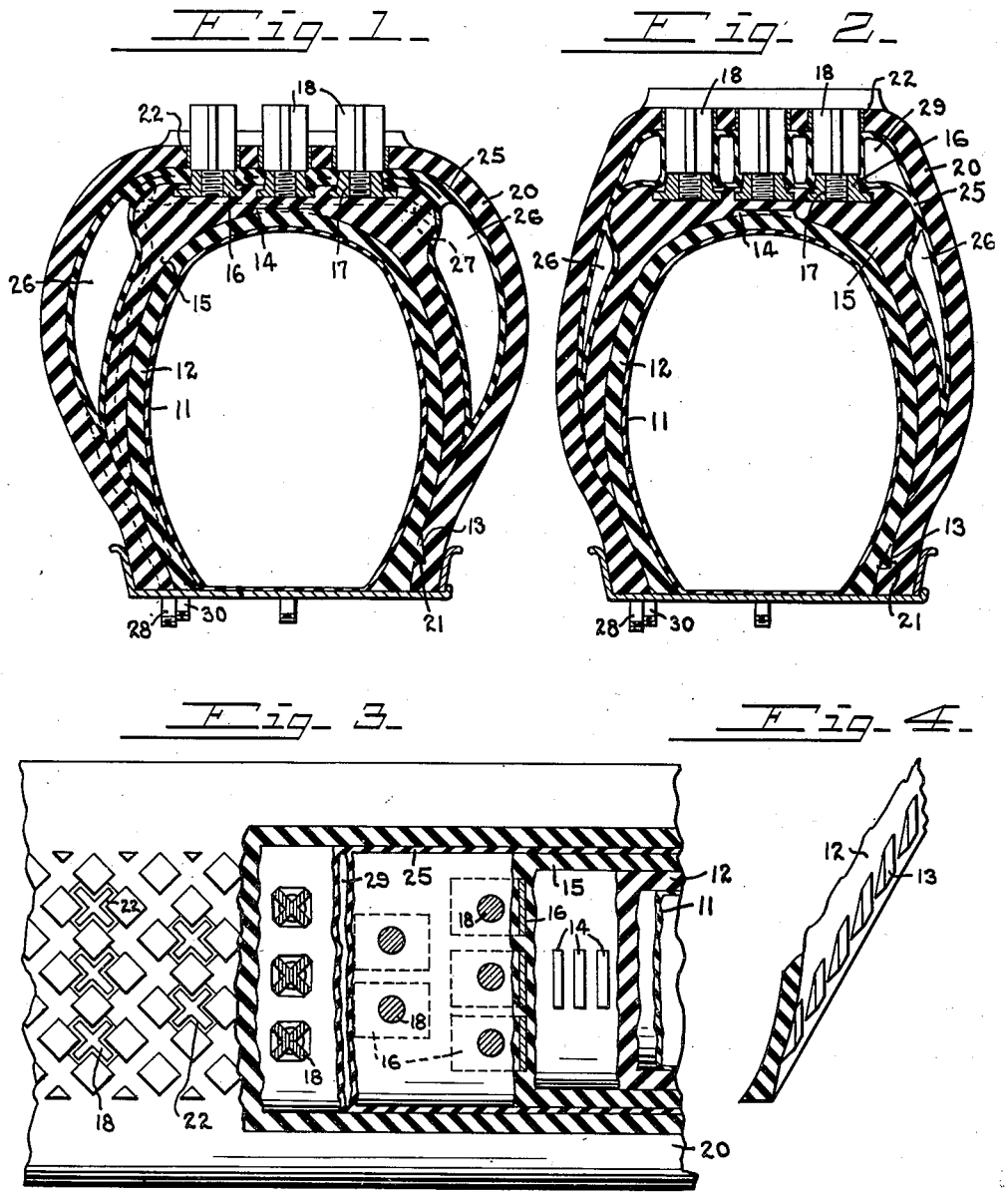

2,217,122

UNITED STATES PATENT OFFICE 2,217,122

ANTISKID TIRE

William G. Lowry, Cincinnati, Ohio

Application March 25, 1939, Serial No. 264,139

5 Claims. (Cl. 152—167)

My invention relates to a new and useful tire for use on all types of vehicles, but primarily useful on trucks and buses. On the heavy type of vehicle it is often difficult to place antiskid chains, consequently such vehicles are driven on ice or other slippery roads without any means of skid control.

My invention contemplates means built into the tire, which can be readily brought into use to form antiskid means when needed or be retracted into the tire for normal use of the tire.

The object of my invention is to provide multiple casings havings lugs extending through the outer casing with a flexible tube between the casings for varying the space between the casings. A further object is to provide means for expanding the side walls of the outer casing, thereby reducing the outer circumference of the tire. A further object is to provide means for removing and replacing the respective antiskid lugs. A further object is to provide lugs of a type that will give maximum traction. A still further object is to provide lugs which cannot become unfastened in use.

My invention will be further readily understood from the following description and claims, and from the drawing in which latter:

Fig. 1 is a cross-section of the tire, with the upper tube deflated.

Fig. 2 is a similar view, with the upper tube inflated and the side tube deflated.

Fig. 3 is a plan view of a portion of the tire, partly broken away, and;

Fig. 4 is a perspective view of a portion of the inner casing.

My improved tire comprises an inner tube 11 inside a casing 12, which is provided with lugs 13 along its lower edge and lugs 14 along its upper surface. A partial casing 15 is received over the casing 12 having grooves which coincide with the lugs of casing 12. Casing 15 has plates 16 molded into its upper surface throughout the entire periphery. These plates have threaded apertures 17 arranged to receive threaded plugs 18. The plugs 18 may be of any shape suitable for forming a traction element.

An outer casing 20 is received over the other casings and has cooperating recesses 21 to engage the lugs 13. And has reinforced apertures 22 for the plugs 18 to extend through.

A flexible tube 25 positioned between the casings 15 and 20 has two pockets, one along each side wall around the tire, as indicated at 26, with a small tube 27 connecting the pockets and a valve in the extending small tube 28. The central portion of the tube has a separate air pocket 29 controlled by a valve in a small tube 30. This portion of the tube surrounds the plugs 18, creating an encased air pocket around and between the plugs in all directions.

Thus it will be seen that in ordinary use the pockets 26 are deflated and the pocket 29 is inflated as shown in Fig. 2, to raise the outer casing so the plugs will not extend beyond the tread of the tire. If the road becomes slippery or in such condition requiring antiskid means, the pocket 29 is deflated and the pockets 26 are inflated to draw the outer casing down on the plugs and bulge the side walls, whereby the plugs will extend beyond the tread of the tire to provide the tire with antiskid means.

Having thus fully described my invention, what I claim as new and desire to secure by Letters Patent, is:

1. An antiskid tire comprising a casing, a flexible tube within said casing, a second casing, antiskid means extending from said first named casing through said second named casing, and pneumatic means between said casings for changing the relative position of said casings to each other.

2. An antiskid tire comprising a casing, plugs extending from said casing, a partitioned flexible tube over said casing surrounding said plugs, means for inflating and deflating said tubes, a second casing over said partitioned tube and apertures in said second casing to permit said plugs to extend through said second casing when said flexible tube is deflated.

3. An antiskid tire comprising a casing, plugs extending from said casing, a second casing over said first named casing, apertures in said second named casing registering with said plugs, said plugs extending into said apertures, a tube between said casings divided into compartments comprising a pair of connected side compartments and an intermediate compartment surrounding said plugs, and means for inflating and deflating said compartments whereby said second named casing can be retracted or extended on said plugs.

4. An antiskid tire comprising a casing, a flexible tube within said casing, plates molded into said casing, plugs extending from said casing and removably secured to said plates, a flexible pneumatic tube over said casing divided into a pair of connected side compartments and an intermediate compartment surrounding said plugs, a second casing over said divided tube having apertures through which said plugs extend, and valve means for independently inflating or deflating said side compartments or said intermediate compartment to change the relative position of the second casing on said plugs.

5. An antiskid tire comprising an inflated casing, removable plugs extending from said casing, a flexible tube over said casing divided into a central compartment and a pair of connected side compartments, said central compartment surrounding said plugs, means for inflating and deflating the respective compartments, and a second casing over said tube having apertures registering with said plugs to permit said plugs to extend through said second casing when said central compartment of said tube is deflated.

WILLIAM G. LOWRY.